United States Patent [19]

Marusik

[11] Patent Number: 5,945,816
[45] Date of Patent: Aug. 31, 1999

[54] SELF-BIASED POWER ISOLATOR SYSTEM

[75] Inventor: C. Lee Marusik, McKinney, Tex.

[73] Assignee: Alcatel Network Systems, Inc.

[21] Appl. No.: 09/063,719

[22] Filed: Apr. 21, 1998

[51] Int. Cl.[6] .................................. G05F 1/56; H02J 1/04
[52] U.S. Cl. .............................................. 323/273; 307/86
[58] Field of Search .................................. 323/273, 274, 323/275, 276, 280; 307/43, 64, 51, 69, 80, 85, 86

[56] References Cited

U.S. PATENT DOCUMENTS

| | | | |
|---|---|---|---|
| 5,598,041 | 1/1997 | Willis | 307/43 |
| 5,686,820 | 11/1997 | Riggio, Jr. | 323/273 |

*Primary Examiner*—Robert E. Nappi
*Assistant Examiner*—Y. J. Han
*Attorney, Agent, or Firm*—Gray Cary Ware & Freidenrich LLP

[57] ABSTRACT

A self-biased power isolator system is disclosed that provides a fault tolerant power system without the need for auxiliary power. Enhancement-mode MOSFET 120 includes a drain coupled to a first node, a source coupled to a second node, and a gate. Amplifier 50 includes inputs for comparing the voltages from the first and second nodes and an output coupled to the gate of MOSFET 120 by which amplifier 50 controls the state of enhancement-mode MOSFET 120. Amplifier 50 further includes a positive power input coupled to the second node and a negative power input coupled to ground. In one embodiment, the first node is operable to be coupled to a power supply 10 and the second node is operable to be coupled to a load 18. A further embodiment allows the architecture to be replicated, each coupled at the second node to provide an N+1 fault tolerant power system.

23 Claims, 2 Drawing Sheets

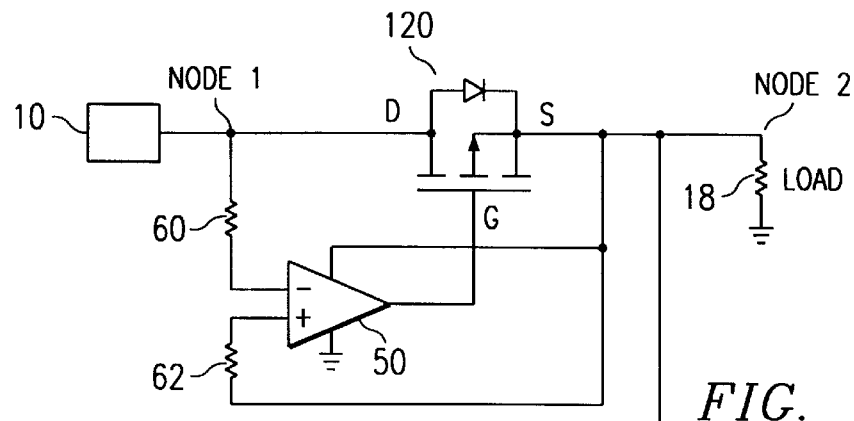
*FIG. 4*
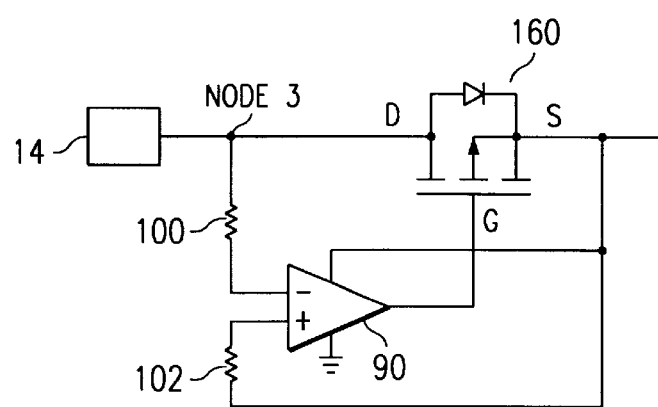
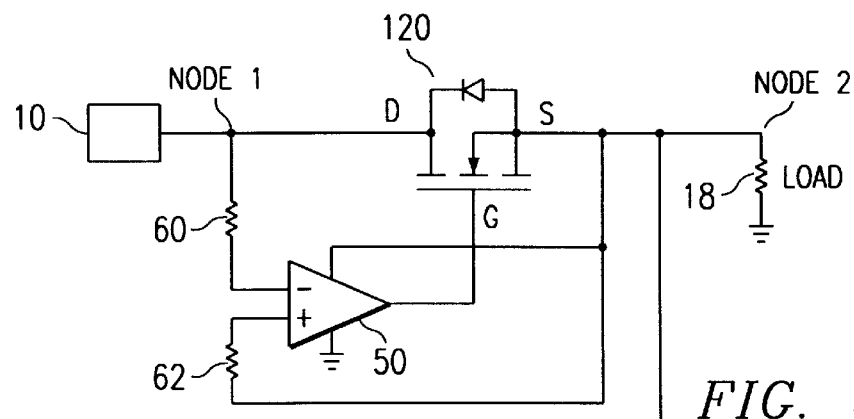
*FIG. 5*
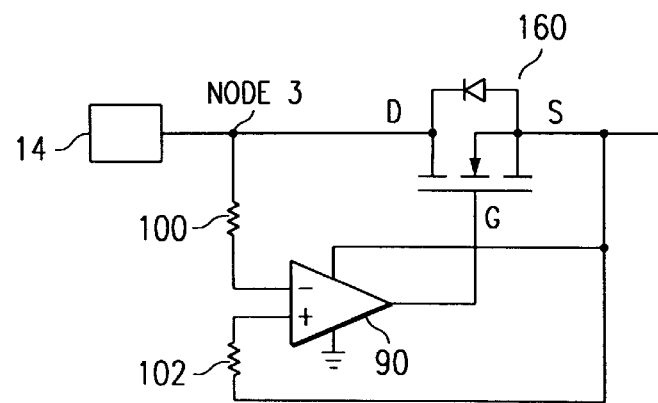

SELF-BIASED POWER ISOLATOR SYSTEM

TECHNICAL FIELD OF THE INVENTION

The present invention relates generally to power systems and more specifically to a self-biased power isolator system.

BACKGROUND OF THE INVENTION

Many electronic systems require highly reliable power systems in order to minimize system down-time. A power system comprises at least one power supply and connecting architecture.

The reliability of a power system relates to the quality of the power supplies. High reliability power supplies are designed with adequate derating of component stress levels. Quality manufacturing processes are crucial to producing a reliable power supply.

One method of improving the reliability of a power system is to improve the quality of the power supplies used in the system. Power supply reliability may be improved by specifying specially screened components or by providing further component derating. However, these solutions may yield only limited power system reliability improvement.

Another method of improving the reliability of a power system is the use of the N+1 redundant power supply architecture. In such an architecture, N power supplies are required to power the load. The power system mean time between failure (MTBF) is then a function of the individual power supply MTBFs. Use of an N+1 architecture can improve power system reliability by orders-of-magnitude.

The N+1 architecture connects power supplies in parallel. Therefore, the system must prevent a failure in any single power supply from causing the voltage at the load to fall below a desired regulation band. In other words, the N+1 architecture requires some means of fault isolation.

One method of providing fault isolation is the use of isolation diodes. However, there is a problem with using diodes to provide fault isolation due to the forward voltage drop across the diodes. The trend in integrated circuit technology is towards lower operating voltages. The degradation of the voltage regulation at the load due to the forward voltage drop of the diodes increases as the system operating voltages decrease.

SUMMARY OF THE INVENTION

In accordance with the present invention, a self-biased power isolator system is provided that substantially reduces disadvantages and problems associated with previously developed fault tolerant power systems.

The self-biased power isolator system of the present invention comprises an enhancement-mode P-Channel MOSFET and an amplifier. The drain of the MOSFET couples to a first node and the source couples to a second node. The output of the amplifier couples to the gate of the enhancement-mode P-Channel MOSFET. The amplifier has two inputs wherein a first input is coupled to the first node and a second input is coupled to the second node. Furthermore, one power input to the amplifier is coupled to the second node and one power input is coupled to ground. The amplifier controls the state of the enhancement-mode P-Channel MOSFET by comparing the voltages at the first and the second node and setting the voltage at the gate of the P-Channel MOSFET accordingly.

More specifically, the present invention can include a positive power supply coupled to the first node. The positive power supply, the enhancement-mode P-Channel MOSFET and the amplifier may be integrated into a single package such that an output of the package is coupled to the second node.

In another embodiment, the self-biased power isolator is configured with an enhancement-mode N-channel MOSFET, an amplifier and a negative power supply.

The present invention can further include a second package of identical elements to the single integrated package referred to above. The output of the second package and the output of the first package can be coupled together at the second node. The first package and second package can provide a fault tolerant self-biased power system.

A technical advantage of the present system is that an N+1 power system architecture may be built using the present invention with increased power efficiency over systems that use isolation diodes.

A further technical advantage of the present invention is that the system provides fault isolation without the use of an auxiliary power supply to bias the power isolator.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein:

FIG. 4 is a schematic of a self-biased power isolator according to one embodiment of the present invention; and FIG. 5 is a schematic of a self-biased power isolator according to an alternative embodiment of the present invention.

DETAILED DESCRIPTION OF THE INVENTION

Figure 1:
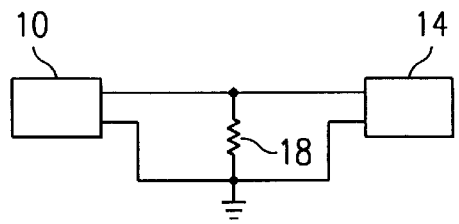
FIG. 1 is a schematic of a simple prior art 1+1 redundant power system.
Figure 2:
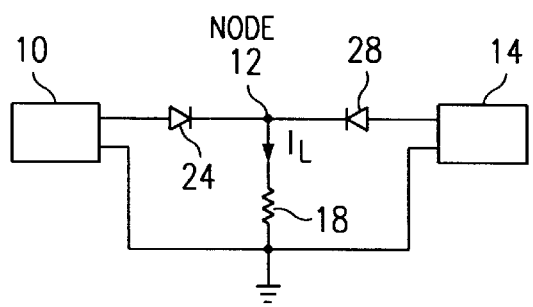
FIG. 2 is a schematic of a prior art redundant 1+1 power system with power isolation using isolation diodes.
Figure 3:
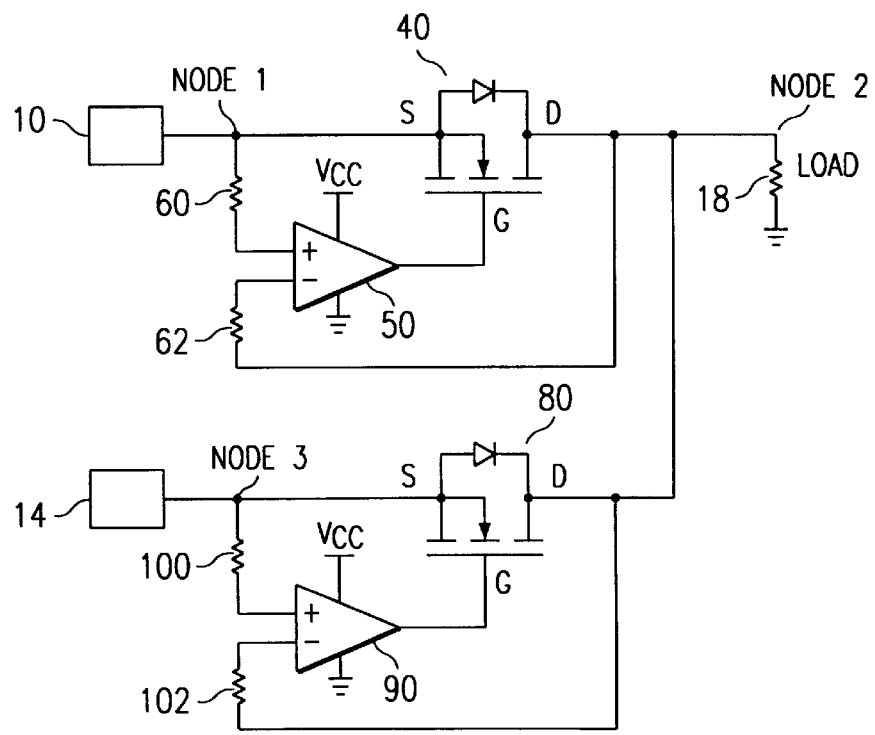
FIG. 3 is a schematic of a prior art 1+1 redundant power system with power isolation using N-Channel MOSFETs.

Preferred embodiments of the present invention are illustrated in the FIGUREs, like numerals being used to refer to like and corresponding parts of the various drawings. FIG. 1 through FIG. 3 depict prior art.

FIG. 1 is a schematic of a simple 1+1 redundant power system. A first power supply 10 connects in parallel with a second power supply 14 such that both deliver power to load 18. The problem with such a redundant power system is that one of the power supplies may fail in a manner that causes a drop in the voltage level applied to load 18. For example, if a short occurs across the output of power supply 14 then power supply 14 will act as low impedance to power supply 10. Such an event would likely cause power supply 10 to enter an overload condition such as a current limiting mode and the voltage at the load will decrease.

Such a system is not fault tolerant because a single failure can cause a loss of voltage regulation at the load. In order to provide fault tolerance, the system must be able to isolate the faulty power supply. With proper fault isolation, the redundant power supply can power the load when a single failure occurs. One such method of providing fault isolation in a power system is the use of isolation diodes.

FIG. 2 is a schematic of a 1+1 redundant power system with power isolation using isolation diodes. Power supply 10 couples with isolation diode 24 to node 12. Similarly, power supply 14 couples with isolation diode 28 to node 12. Load 18 couples to node 12 such that the load current ($I_L$) flows in the direction shown in FIG. 2. An N+1 redundant power system with isolation diodes can isolate a failed power supply such that the power system maintains voltage regulation at the load. For example, if a fault should occur in power supply 14, the isolation diode 28 becomes reversed biased. Therefore, failed power supply 14 does not overload power supply 10, and power supply 10 can still supply the power required by load 18. The fault in power supply 14 has been isolated.

Although isolation diodes provide fault isolation, the resulting diode drop degrades the voltage regulation at the load and decreases the power efficiency of the system. As electronic systems migrate toward lower operating voltages, the voltage degradation due to the isolation diodes becomes more significant. It is an object of the current invention to minimize voltage degradation and to improve power efficiency in N+1 redundant power systems.

One possible solution to the power efficiency problem of the isolation diode system is to replace the isolation diodes of the N+1 redundant power system with N-Channel enhancement-mode MOSFETs.

In the on-state, the MOSFET provides a low impedance path between its drain and source terminals, termed the drain-to-source on-resistance $R_{DS(on)}$. In the off-state, the MOSFET provides a high impedance path between its drain and source to block current flow. Low on-resistance MOSFETs offer a potential for replacing the isolation diodes to provide fault isolation in the N+1 redundant power supply architecture. The voltage drop of a power MOSFET when the MOSFET is turned on is the product of the drain current and the MOSFET's on-resistance. In most applications, this voltage drop will be much less than the forward drop for a Schottky diode.

When using MOSFETs in an N+1 power supply architecture, the state of each MOSFET must be controlled to provide either a low impedance path or blocking action, as dictated by the conditions of the power supplies.

FIG. 3 is a schematic of a 1+1 redundant power system with power isolation using N-Channel enhancement-mode MOSFETs. In the circuit of FIG. 3, node 1 is the output of power supply 10. Node 2 is the input voltage point for load 18, and node 3 is the output of power supply 14. The system contains N-Channel MOSFET 40 with a source, a drain and a gate oriented as shown. The source couples to node 1. The drain couples to node 2. The system further includes amplifier 50. Amplifier 50 contains a non-inverting input coupled to node 1 via resistor 60, an inverting input coupled to node 2 via resistor 62, and an output coupled to the gate of MOSFET 40. Amplifier 50 further includes power connections coupled to external bias supply $V_{cc}$ and ground.

The power isolation circuit also contains a second N-Channel MOSFET 80. MOSFET 80 contains a source coupled to node 3, a drain coupled to node 2, and a gate. Amplifier 90 contains a non-inverting input coupled to node 3 via resistor 100, an inverting input coupled to node 2 via resistor 102, and an output coupled to the gate of MOSFET 80. Amplifier 90 further contains power connections coupled to external bias supply $V_{cc}$ and ground.

N-Channel MOSFETs 40 and 80 contain a body diode as part of the structure of each MOSFET. The body diode anode connects to the source and the cathode connects to the drain of each MOSFET. When the MOSFET is turned off, it acts as a diode similar to the system shown in FIG. 2. Therefore, when both MOSFET 40 and MOSFET 80 are turned off, such a system can provide power isolation similar to a simple isolation diode system of FIG. 2. However, when the MOSFET is turned on the drain-to-source voltage drop, which is the product of the drain current and the drain-to-source resistance $R_{DS(on)}$, becomes much lower than the voltage drop of the body diode. In operation, if MOSFET 40 is turned on and MOSFET 80 is turned off, then power supply 10 can power load 18 and can do so with a lower voltage drop than if a simple isolation diode was used instead of N-Channel MOSFET 40. Furthermore, if a fault develops in power supply 14, the N-Channel MOSFET 80 can act as a high impedance preventing the fault in power supply 14 from compromising the operation of the system. Thus, by controlling the states of MOSFET 40 and MOSFET 80, the power system can provide fault isolation with less voltage degradation at a greater power efficiency than the use of simple isolation diodes.

Furthermore, the system can switch between power supply 10 and power supply 14 if necessary because one of the power supplies develops a fault. An N-Channel enhancement-mode MOSFET turns on when its gate voltage exceeds its source voltage by the MOSFET's gate-to-source threshold voltage. The current system achieves this in the following manner. Amplifier 50 compares the voltage at node 1 to the voltage at node 2 through resistors 60 and 62. Amplifier 50 can be a "rail-to-rail" operational amplifier meaning the output is driven between its high voltage rail of the power input $V_{cc}$ and its low voltage rail which in this case is ground. If the voltage at node 1 is greater than the voltage at node 2, the output of amplifier 50 approaches its bias voltage $V_{cc}$. If the voltage at node 2 is greater than the voltage at node 1, the output approaches ground potential. Therefore, the voltage at the gate of MOSFET 40 depends upon the voltages at node 1 and node 2. If the voltage at node 1 is greater than the voltage at node 2, amplifier 50 will set the gate voltage to approximately the bias voltage $V_{cc}$. If $V_{cc}$ is greater than the voltage at node 1 by an amount greater than the MOSFET's gate-to-source threshold, MOSFET 40 will turn on. Thus, for the output of amplifier 50 to drive the gate of MOSFET 40 higher than the source of MOSFET 40, the external bias supply $V_{cc}$ must be set somewhat greater than the output voltage of power supply 10. If the voltage at node 2 is greater than the voltage at node 1, amplifier 50 will set the gate of MOSFET 40 to approximately ground potential. This will force the gate of MOSFET 40 to be negative with respect to its source, and MOSFET 40 will turn off. This arrangement is duplicated with respect to MOSFET 80 and amplifier 90.

In operation, the N+1 redundant power system with power isolation using N-channel MOSFETs can use one power supply to power load 18 and switch to the redundant power supply if a fault occurs. Thus, the power system of FIG. 3 provides fault isolation. However, this system requires an external bias supply to power amplifier 50 and amplifier 90.

It is a technical advantage of the present invention to maintain power fault isolation similar to the system above without the need for an external bias supply.

FIG. 4 is a schematic of a self-biased power isolator according to one embodiment of the present invention. The self-biased power isolator replaces the N-Channel MOSFETs of FIG. 3 with P-Channel enhancement-mode MOSFETs. The nodes in FIG. 4 are identical to the nodes shown in FIG. 3. Node 1 is the output of power supply 10, node 2 is the input to load 18, and node 3 is the output of power supply 14. The self-biased power isolator system contains P-Channel enhancement-mode MOSFETs 120 and 160.

P-Channel enhancement-mode MOSFETs turn on when the gate potential is less than the source potential by the gate-to-source threshold voltage. The P-Channel enhancement-mode MOSFET orientation in this embodiment is for operation in the first quadrant of its $V_{DS}$-$I_{DS}$ characteristic. Normal operation for a P-Channel enhancement-mode MOSFET is in the third quadrant, with drain current flowing out of the drain and with negative drain-to-source voltage polarity. In the present embodiment, MOSFET 120 and MOSFET 160 are oriented for reverse-mode operation, meaning the drain current flows into the drain and the drain-to-source voltage is positive.

MOSFET 120 contains a drain coupled to node 1, a source coupled to node 2 and a gate. Amplifier 50 controls the operation of MOSFET 120. Amplifier 50 contains an output coupled to the gate of MOSFET 120, a non-inverting input coupled to node 2 via resistor 62, and an inverting input coupled to node 1 via resistor 60. Furthermore, the positive power input to amplifier 50 is coupled to node 2, and the negative power input to amplifier 50 is coupled to ground. Amplifier 50 can control the operation of MOSFET 120 in the following manner. If the voltage at node 2 is greater than the voltage at node 1, the output of amplifier 50 can set the potential at the gate of MOSFET 120 approximately equal to the potential at the source of MOSFET 120 (node 2), which will turn MOSFET 120 off. In such a state, MOSFET 120 acts as a diode. If the voltage at node 2 is less than the voltage at node 1, the output of amplifier 50 will approach ground potential. Therefore, the voltage at the gate of MOSFET 120 will be less than the voltage at the source of MOSFET 120 which will turn the MOSFET on. In such a state, MOSFET 120 acts as a low impedance path with a drain-to-source resistance $R_{DS(ON)}$.

In a like manner, the self-biased power isolation system can contain another P-Channel enhancement-mode MOSFET 160. MOSFET 160 has a drain coupled to node 3, a source coupled to node 2, and a gate. MOSFET 160 can be controlled by amplifier 90. Amplifier 90 has an output coupled to the gate of MOSFET 160, a non-inverting input coupled to node 2 via resistor 102, and an inverting input coupled to node 3 via resistor 100. Amplifier 90 can control the operation of MOSFET 160 in the same manner as amplifier 50 can control MOSFET 120. If the voltage at node 2 is greater than the voltage at node 3, the output of amplifier 90 closely follows the voltage at node 2. This will set the gate voltage of MOSFET 160 approximately equal to its source voltage, which will turn MOSFET 160 off. If the voltage at node 2 is less than the voltage at node 3, the output of amplifier 90 approaches ground potential. This will set the gate voltage of MOSFET 160 to a voltage less than its source voltage, turning MOSFET 160 on.

Amplifier 50 and amplifier 90 can be rail-to-rail devices. As such, the outputs of each amplifier will switch between the voltage at their positive power input (node 2) and ground.

For an example of the operation of the self-biased power isolator, assume initially a steady state where power supply 10 and power supply 14 are turned off. There is no source of power for either amplifier 50 or amplifier 90. Next, assume that power supply 10 begins to turn on. As the output voltage of power supply 10 begins to rise, the body diode of MOSFET 120 starts to conduct when the output voltage of power supply 10 exceeds the cut-in voltage of the body diode. The source voltage of MOSFET 120 then starts to follow the drain voltage, offset by the forward drop of the body diode. When node 2 reaches the minimum required supply voltage for amplifier 50, amplifier 50 becomes operational. Because of the voltage drop across the body diode of MOSFET 120 at this time, the voltage at node 2 is less than the voltage at node 1. When the voltage at node 2 is less than the voltage at node 1, the output of amplifier 50 approaches ground potential. As the output voltage of power supply 10 continues to rise, MOSFET 120 is turned on when its gate-to-source voltage crosses its turn-on threshold voltage. Once MOSFET 120 is turned on, the voltage at node 2 closely follows the voltage at node 1, now offset by only the product of the current and $R_{DS(ON)}$. Thus, load 18 is powered by power supply 10.

Amplifier 90 is also operational at this time. Since power supply 14 is still turned off, the voltage at node 2 is greater than the voltage at node 3, and the output of amplifier 90 closely follows the voltage at node 2. This sets the gate voltage of MOSFET 160 approximately equal to its source voltage, which keeps MOSFET 160 turned off. In this condition, the body diode of MOSFET 160 is reverse biased. Thus, power supply 14 is decoupled from load 18.

Now assume that power supply 14 is turned on. As long as the instantaneous output voltage of power supply 10 at node 1 is greater than the instantaneous output voltage of power supply 14 at node 3, MOSFET 120 is turned on and MOSFET 160 is turned off.

If at any time the output voltage of power supply 14 at node 3 becomes greater than the output voltage of power supply 10 at node 1, either as power supply 14 is being turned on or at some time later, then amplifier 50 turns MOSFET 120 off and amplifier 90 turns MOSFET 160 on. The voltage at node 2 is thus determined by the power supply with the highest output voltage. The power supply with the lowest output voltage is decoupled from node 2 by its corresponding MOSFET.

The previous description describes one embodiment of the present invention. It is possible for the current invention to be applied to numerous power supplies in an N+1 power system architecture. Furthermore, it is possible that the power supplies will not have a time delay in their power up characteristic. It is also possible that the output voltages of both power supplies are nearly identical such that both MOSFETs are simultaneously turned on so that both supplies deliver current to load 18.

This embodiment of present invention can operate to isolate a fault in the following manner. Assuming that the output voltage of power supply 10 is initially higher than the output voltage of power supply 14, then MOSFET 120 is turned on and MOSFET 160 is turned off, and all the load current to load 18 is being delivered by power supply 10. If a fault occurring in power supply 10 causes its output voltage to start decreasing, the voltage at node 2 will decrease accordingly. When the voltage at node 2 becomes less than the output voltage of power supply 14 at node 3, the output of amplifier 90 switches to near ground potential to turn MOSFET 160 to the on-state. As the output voltage of power supply 10 at node 1 continues to decrease, amplifier 50 switches to a voltage approaching the voltage at node 2. This causes the gate voltage of MOSFET 120 to be nearly equal to its source voltage, which turns MOSFET 120 to the off-state. All the load current to load 18 will then be delivered by power supply 14, with the voltage at node 2 closely following the output voltage of power supply 14. MOSFET 120 will then be in a high impedance off-state, preventing the fault which occurred at the output of power supply 10 from causing loss of voltage regulation at node 2.

It is a technical advantage of such a self-biased power isolator that power isolation is provided without the need for an external bias supply. It is a further technical advantage of such a power isolation scheme that voltage degradation is minimized and power efficiency is increased over a system that achieves power isolation with the use of isolation diodes.

FIG. 5 shows an alternative embodiment of the present invention that utilizes negative power supplies and N-Channel enhanced-mode MOSFETs. FIG. 5 differs from FIG. 4 in that power supply 10 and power supply 14 have negative output voltages and MOSFET 120 and MOSFET 160 of FIG. 5 are N-Channel enhancement-mode MOSFETs. Furthermore, the positive power inputs to amplifier 50 and to amplifier 90 are connected to ground and the negative power inputs to amplifier 50 and to amplifier 90 are coupled to node 2.

In the embodiment of FIG. 5, amplifier 50 can control the operation of MOSFET 120 in the following manner. If the voltage at node 1 is more negative than the voltage at node 2, the output of amplifier 50 approaches ground potential. This will set the gate voltage of MOSFET 120 to a voltage more positive than its source voltage, which will turn on the N-Channel MOSFET. If the voltage at node 1 is more positive than the voltage at node 2, the output of amplifier 50 can set the potential at the gate of MOSFET 120 approximately equal to the potential at its source, which will turn off the N-Channel MOSFET.

In the FIG. 5 embodiment, the present invention operates to isolate a fault in the following manner. When the magnitude of the output voltage of power supply 10 is greater than the magnitude of the output voltage of power supply 14, that is the voltage at node 1 is more negative than the voltage at node 3, then MOSFET 120 is turned on and MOSFET 160 is turned off, and all the load current to load 18 is being delivered by power supply 10. If a fault occurring in power supply 10 causes its output voltage to start decreasing in magnitude, the magnitude of the voltage at node 2 will decrease accordingly. When the magnitude of the voltage at node 2 becomes less than the magnitude of the output voltage of power supply 14 at node 3, the output of amplifier 90 switches to near ground potential to turn MOSFET 160 to the on-state. As the magnitude of the output voltage of power supply 10 at node 1 continues to decrease, amplifier 50 switches to a voltage approaching the voltage at node 2. This causes the gate voltage of MOSFET 120 to be nearly equal to its source voltage, which turns MOSFET 120 to the off-state. All the load current to load 18 will then be delivered by power supply 14, with the voltage at node 2 closely following the output voltage of power supply 14. MOSFET 120 will then be in a high impedance off-state, preventing the fault which occurred at the output of power supply 10 from causing loss of voltage regulation at node 2.

Although shown with only two power supplies, the present invention can be extended to an N+1 redundant power system by paralleling more supplies and their power isolator architecture.

Several different embodiments of the present invention are possible. For example, each power supply and its accompanying architecture could be grouped into separate packages. The output of each package could then be connected together to form node 2. In such a fashion, several different power supplies with accompanying power isolation architecture could be grouped together to provide a fault tolerant power supply system to drive a load.

Although the present invention has been described in detail, it should be understood that various changes, substitutions and alterations can be made thereto without departing from the sphere and scope of the invention as defined by the appended claims.

What is claimed is:

1. A self-biased power isolator system comprising:
  a first P-Channel enhancement-mode MOSFET having a drain coupled to a first node, a source coupled to a second node, and a gate;
  a first amplifier having a first input coupled to the first node, a second input coupled to the second node, an output coupled to the gate of the first P-Channel enhancement-mode MOSFET, a first power input coupled to the second node, and a second power input coupled to ground; and
  a positive power supply coupled to the first node.

2. The system of claim 1 wherein the first P-Channel enhancement-mode MOSFET, the first amplifier, and the positive power supply are grouped into a single package wherein an output of the single package is coupled to the second node.

3. The system of claim 1, wherein the first amplifier is a rail-to-rail device.

4. A self-biased power isolator system comprising:
  a first P-Channel enhancement-mode MOSFET having a drain coupled to a first node, a source coupled to a second node, and a gate;
  a first amplifier having a first input coupled to the first node, a second input coupled to the second node, an output coupled to the gate of the first P-Channel enhancement-mode MOSFET, a first power input coupled to the second node, and a second power input coupled to ground;
  a second P-Channel enhancement-mode MOSFET having a drain coupled to a third node, a source coupled to the second node, and a gate; and
  a second amplifier having a first input coupled to the third node, a second input coupled to the second node, an output coupled to the gate of the second P-Channel enhancement-mode MOSFET, and a first power input coupled to the second node and a second power input coupled to ground.

5. The system of claim 4, further comprising a first positive power supply coupled to the first node and a second positive power supply coupled to the third node.

6. The system of claim 5 wherein:
  the first positive power supply, the first P-Channel enhancement-mode MOSFET, and the first amplifier are grouped into a first package;
  the second positive power supply, the second P-Channel enhancement-mode MOSFET, and the second amplifier are grouped into a second package; and
  wherein an output of the first package and an output of the second package are operable to be coupled together to form the second node, wherein the second node is operable to power a load.

7. The system of claim 6, further comprising:
  a first resistor coupling the first node to the first input of the first amplifier, and
  a second resistor coupling the second node to the second input of the first amplifier.

8. The system of claim 7, further comprising:
  a third resistor coupling the third node to the first input of the second amplifier, and
  a fourth resistor coupling the second node to the second input of the second amplifier.

9. The system of claim 4, wherein the first amplifier is a rail-to-rail device and the second amplifier is a rail-to-rail device.

10. A self-biased power isolator system comprising:
a first P-Channel enhancement-mode MOSFET having a drain coupled to a first node, a source coupled to a second node, and a gate;
a first amplifier having a first input coupled to the first node, a second input coupled to the second node, an output coupled to the gate of the first P-Channel enhancement-mode MOSFET, a first power input coupled to the second node and a second power input coupled to ground;
a first resistor coupling the first node to the first input of the first amplifier;
a second resistor coupling the second node to the second input of the first amplifier; and
a positive power supply coupled to the first node.

11. The system of claim 10 wherein the first amplifier is a rail-to-rail device.

12. The system of claim 10 grouped into a single package having an output coupled to the second node and operable to power a load.

13. The system of claim 10 further comprising:
a second P-Channel enhancement-mode MOSFET having a drain coupled to a third node, a source coupled to the second node, and a gate;
a second amplifier having a first input coupled to the third node, a second input coupled to the second node, an output coupled to the gate of the second P-Channel enhancement-mode MOSFET, a first power input coupled to the second node and a second power input coupled to ground;
a third resistor coupling the third node to the first input of the second amplifier; and
a fourth resistor coupling the second node to the second input of the second amplifier.

14. The system of claim 13 further comprising a first positive power supply coupled to the first node and a second positive power supply coupled to the third node.

15. The system of claim 14 wherein the first amplifier is a rail-to-rail device and the second amplifier is a rail-to-rail device.

16. The system of claim 15 wherein:
the first positive power supply, the first P-Channel enhancement-mode MOSFET, the first amplifier, the first resistor and the second resistor are grouped into a first package having an output coupled to the second node; and the second positive power supply, the second P-Channel enhancement-mode MOSFET, the second amplifier, the third resistor and the fourth resistor are grouped into a second package having an output coupled to the second node; and
wherein the second node is operable to power a load.

17. A self-biased power isolator system comprising:
a first N-Channel enhancement-mode MOSFET having a drain coupled to a first node, a source coupled to a second node, and a gate;
a first amplifier having a first input coupled to the first node, a second input coupled to the second node, an output coupled to the gate of the first N-Channel enhancement-mode MOSFET, a first power input coupled to the second node, and a second power input coupled to ground; and
a negative power supply coupled to the first node.

18. The system of claim 17 wherein the first N-Channel MOSFET, the first amplifier, and the negative power supply are grouped into a single package wherein an output of the single package is coupled to the second node.

19. The system of claim 17 further comprising:
a second N-Channel enhancement-mode MOSFET having a drain coupled to a third node, a source coupled to the second node, and a gate;
a second amplifier having a first input coupled to the third node, a second input coupled to the second node, an output coupled to the gate of the second N-Channel enhancement-mode MOSFET, a first power input coupled to the second node, and a second power input coupled to ground; and
a second negative power supply coupled to the third node.

20. The system of claim 19 wherein:
the first negative power supply, the first N-Channel MOSFET, and the first amplifier are grouped into a first package;
the second negative power supply, the second N-Channel MOSFET, and the second amplifier are grouped into a second package; and
wherein an output of the first package and an output of the second package are operable to be coupled together to form the second node, wherein the second node is operable to power a load.

21. The system of claim 20, further comprising:
a first resistor coupling the first node to the first input of the first amplifier; and
a second resistor coupling the second node to the second input of the first amplifier.

22. The system of claim 21, further comprising:
a third resistor coupling the third node to the first input of the second amplifier; and
a fourth resistor coupling the second node to the second input of the second amplifier.

23. The system of claim 19, wherein each amplifier is a rail-to-rail device.

* * * * *